United States Patent
Codella et al.

(10) Patent No.: US 9,280,819 B2
(45) Date of Patent: Mar. 8, 2016

(54) IMAGE SEGMENTATION TECHNIQUES

(71) Applicant: International Business Machines Corporation, Armonk, NY (US)

(72) Inventors: Noel C. Codella, Lagrangeville, NY (US); John R. Smith, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 13/975,575

(22) Filed: Aug. 26, 2013

(65) Prior Publication Data

US 2015/0055842 A1  Feb. 26, 2015

(51) Int. Cl.
  *G06K 9/00*  (2006.01)
  *G06T 7/00*  (2006.01)
  *G06K 9/62*  (2006.01)

(52) U.S. Cl.
  CPC .............. *G06T 7/0014* (2013.01); *G06K 9/621* (2013.01); *G06T 7/0083* (2013.01); *G06T 7/0087* (2013.01); *G06T 7/0089* (2013.01); *G06K 2209/05* (2013.01); *G06T 2207/30004* (2013.01)

(58) Field of Classification Search
  None
  See application file for complete search history.

(56) References Cited

U.S. PATENT DOCUMENTS

| | | | |
|---|---|---|---|
| 6,996,549 B2 | 2/2006 | Zhang et al. | |
| 7,711,181 B2 | 5/2010 | Kee et al. | |
| 8,135,189 B2 | 3/2012 | Jerebko et al. | |
| 8,144,950 B2 | 3/2012 | Peters et al. | |
| 8,290,266 B2 | 10/2012 | Liu | |
| 8,331,699 B2 | 12/2012 | Dewan et al. | |
| 2006/0115145 A1 | 6/2006 | Bishop et al. | |
| 2008/0247646 A1 | 10/2008 | Chefd'hotel et al. | |
| 2009/0018808 A1 | 1/2009 | Bronstein et al. | |
| 2009/0129650 A1* | 5/2009 | Hawkes et al. | 382/131 |
| 2009/0185731 A1 | 7/2009 | Ray et al. | |
| 2009/0202150 A1 | 8/2009 | Fradkin et al. | |
| 2010/0232686 A1 | 9/2010 | Dewan et al. | |

OTHER PUBLICATIONS

Lin et al., Nonrigid Medical Image Registration Based on Mesh Deformation Constraints, PubMed Central ID 3574660, Computational and Mathematical Methods in Medicine, 2013, 373082, Print Publication Date Jan. 1, 2013, Electronic Publication Date Feb. 3, 2013, 8 pages.

Joshi et al. Multiscale Deformable Model Segmentation and Statistical Shape Analysis Using Medial Descriptions, Medical Imaging, IEEE Transactions on, vol. 21, No. 5, 14 pages, May 2002.

Pizer et al., Multiscale Medial Shape-Based Analysis of Image Objects, Proceedings of the IEEE, vol. 91, No. 10, pp. 1670-1679, Oct. 2003.

(Continued)

*Primary Examiner* — Atiba O Fitzpatrick
(74) *Attorney, Agent, or Firm* — Ryan, Mason & Lewis, LLP

(57) ABSTRACT

Methods for image segmentation are provided herein. A method includes creating an anatomical model from training data comprising one or more imaging modalities, generating one or more simulated images in a target modality based on the anatomical model and one or more principles of physics pertaining to image contrast generation, and comparing the one or more simulated images to an unlabeled input image of a given imaging modality to determine a simulated image of the one or more simulated images to represent the unlabeled input image.

18 Claims, 4 Drawing Sheets

(56) References Cited

OTHER PUBLICATIONS

Liu et al., A Large-to-Fine-Scale Shape Prior for Probabilistic Segmentations Using a Deformable M-REP, Computer Vision and Pattern Recognition Workshops, 2008.
IPCOM00015265D, Fast Medical Image Segmentation with Hierarchical Meshes, 2 pages, published May 9, 2007.
IPCOM000142487D, Method for Detecting and Characterizing Shapes in Medical Images, published Oct. 30, 2006.
Collins et al., Design and Construction of a Realistic Digital Brain Phantom, IEEE Transactions on Medical Imaging, vol. 17, No. 3, p. 463-468, Jun. 1998.
Ginneken et al. Active Shape Model Segmentation with Optimal Features, IEEE Transactions on Medical Imaging 2002.
Cootes et al., Active Appearance Models, IEEE Transactions on Pattern Analysis and Machine Intelligence 2001.
Bosch et al., Fully Automated Endocardial Contour Detection in Time Sequences of Echocardiograms by Active Appearance-Motion Models, International Congress Series, vol. 1230, Jun. 2001, pp. 941-947.
Codella et al., Improved Left Ventricular Mass Quantification with Partial Voxel Interpolation: In Vivo and Necropsy Validation of a Novel Cardiac MRI Segmentation Algorithm. Circ Cardiovasc Imaging, Jan. 5, 2012(1):137-46.
Zhan et al., Cross Modality Deformable Segmentation Using Hierarchical Clustering and Learning, Med Image Comput Comput Assist Interv. 2009, 12(Pt 2): 1033-41.
Heimann et al., Statistical Shape Models for 3D Medical Image Segmentation: A Review, Med Image Anal. Aug. 13, 2009(4):543-63, Epub May 27, 2009.
Burke et al., A Robust Gradient Sampling Algorithm for Nonsmooth, Nonconvex Optimization. SIAM Journal on Optimization, 15(3):751-779, 2003.

\* cited by examiner

IMAGE SEGMENTATION TECHNIQUES

FIELD OF THE INVENTION

Embodiments of the invention generally relate to information technology, and, more particularly, to imaging technology.

BACKGROUND

Challenges exist in anatomical segmentation in medical imaging. Existing approaches including active shape models and active appearance models generate statistical models of a two-dimensional (2D) shape which can be deformed until the model matches an image. However, such approaches are restricted to the modality in which they are trained. In modalities where image content is low, such as projection x-ray or ultrasound, image ambiguity can lead to additional error in the model through error in the training data due to increased intra-observer and inter-observer variability.

Accordingly, a need exists for anatomical segmentation in medical imaging using a statistical model of anatomy built from detailed high-resolution imaging.

SUMMARY

In one aspect of the present invention, techniques for image segmentation are provided. An exemplary computer-implemented method can include steps of creating an anatomical model from training data comprising one or more imaging modalities, generating one or more simulated images in a target modality based on the anatomical model and one or more principles of physics pertaining to image contrast generation, and comparing the one or more simulated images to an unlabeled input image of a given imaging modality to determine a simulated image of the one or more simulated images to represent the unlabeled input image.

In another aspect of the invention, an exemplary computer-implemented method can include steps of creating a statistical anatomical model from multiple annotated medical imaging datasets comprising one or more imaging modalities, and generating one or more simulated images in a target modality based on the statistical anatomical model and one or more principles of physics pertaining to image contrast generation. The method also includes the steps of processing the one or more simulated images and an unlabeled medical image of a given imaging modality via a matching algorithm to determine a simulated image of the one or more simulated images that most closely matches the unlabeled input image on a basis of one or more parameters, and labeling the unlabeled medical image with one or more labels corresponding with one or more labels of the determined simulated image.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes medical image segmentation by three-dimensional (3D) high-resolution anatomical model deformation and image modality data acquisition knowledge. At least one embodiment of the invention includes techniques for anatomical segmentation in medical imaging using a statistical model of anatomy built primarily from high-resolution imaging (such as a computed tomography (CT) scan and/or a magnetic resonance imaging (MRI) image). The model can be used, as further detailed herein, to segment anatomy in any medical image modality, including modalities of lower quality or information content, such as an x-ray and/or an echocardiogram (echo).

At least one embodiment of the invention includes using an anatomical model to generate simulated medical images according to the known laws of physics governing image contrast generation in each modality, and deforming the model until a match (for example, a desired and/or selected match) is obtained between the model and an image to be segmented. Such laws of physics may include, but are not limited to, x-ray attenuation of various human tissues (to generate synthetic x-ray or CT images), T1 and T2 magnetic relaxation properties of various human tissues (to generate synthetic MRI images), etc. Accordingly, high-resolution anatomical details from high-resolution imaging modalities can be utilized as a priority for segmentation in lower quality imaging modalities to improve the accuracy of segmentation. Because the anatomical model (in accordance with at least one embodiment of the invention) uses statistical information across a population, the model can be deformed according to population and pathological variations in order to perform segmentation on any medical image modality.

As described herein, at least one embodiment of the invention includes forming a segmentation model in one image modality by using one or more machine learning algorithms to learn an average shape of an anatomical object and how the shape may statistically vary across a population. Additionally, utilizing a priori knowledge pertaining to the laws of physics that govern image generation in other image modalities (such as x-ray, CT, MRI, ultrasound, etc.), such embodiments of the invention include transferring the learned model for application to one or more other image modalities.

Figure 1:
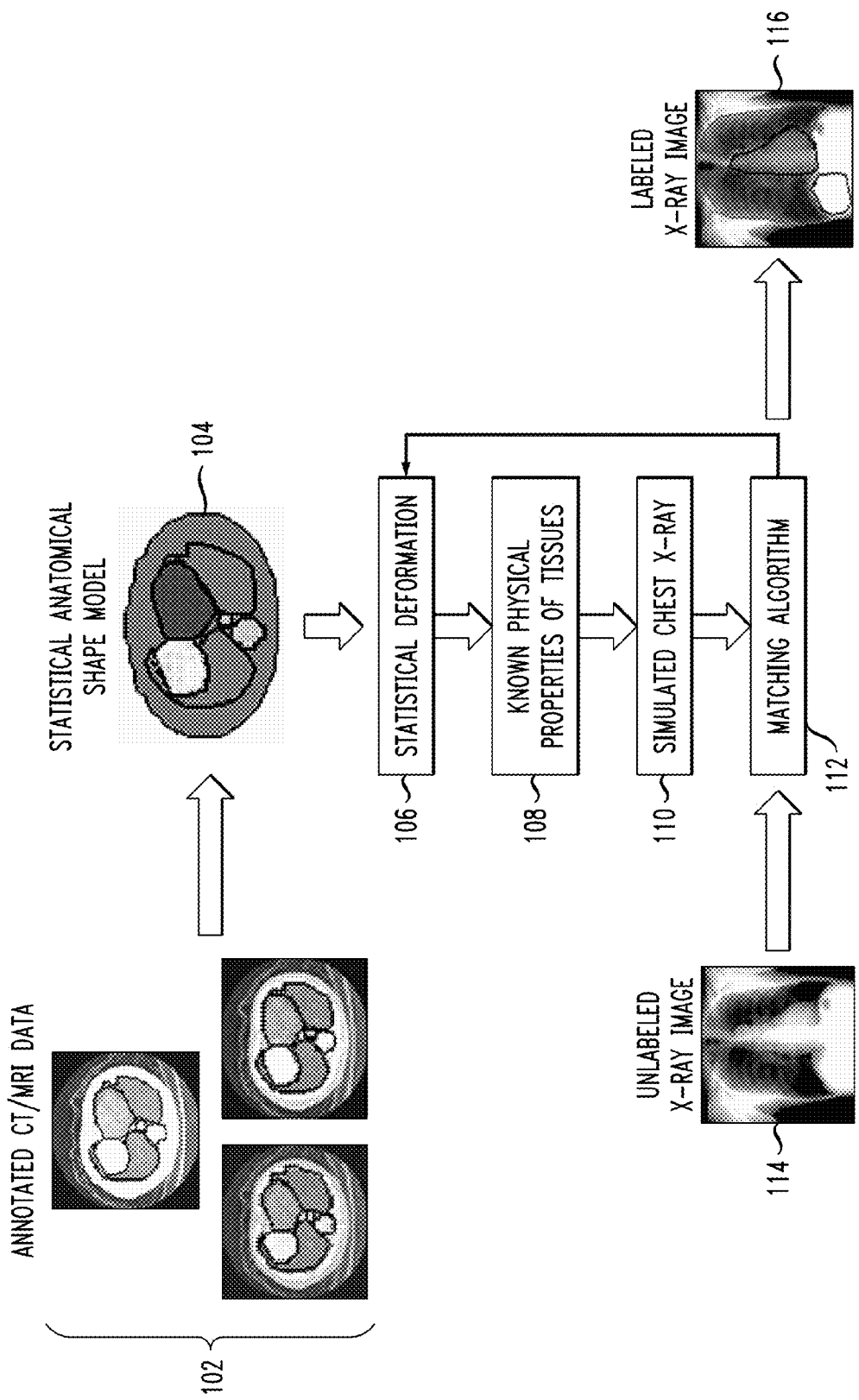
FIG. 1 is a diagram illustrating techniques for segmenting a medical image in any modality, according to an example embodiment of the present invention.

FIG. 1 is a diagram illustrating techniques for segmenting a medical image in any modality, according to an example embodiment of the present invention. By way of illustration, FIG. 1 depicts using annotated high-resolution 3D medical imaging datasets 102, such as MRI and/or CT datasets, to learn a deformable statistical anatomical model 104. Such a deformable statistical model can be learned by representing the human annotations across medical images of multiple individuals and the pixels contained within the annotations as vectors of numerical values. The average vector can be calculated, and each individual annotation can be represented as a vector of the difference between the numerical values corresponding to that annotation and the average vector. Upon collecting many such difference vectors into a matrix, at least one embodiment of the invention can include performing a Principal Component Analysis (PCA) to extract eigenvectors. The average vector represents a typical shape, and the eigenvectors represent the primary axes of variation across an annotated population.

Additionally, given an unlabeled medical image 114 presented in any modality (such as, for example, an x-ray), at least one embodiment of the invention includes using the model 104 to generate a simulated medical image 110 according to the known laws of physics governing image contrast generation in the given modality. This can be carried out using known physical properties of the tissue and mathematics regarding image generation (as depicted in step 108). For example, in the case of an x-ray image, the attenuation of human bone, muscle, fat, blood, are known. A typical distance between the subject and x-ray film, and the subject and the x-ray emitter is also known. By artificially projecting vectors from the emitter through the statistical model of the subject to the surface of the x-ray film, and taking the integral of the x-ray attenuation of the model through each vector that connects the emitter to an x-ray film pixel, at least one embodiment of the invention can include generating a synthetic x-ray image 116.

As also depicted in FIG. 1, multiple steps are carried out in furtherance of deforming the model 106 to generate a simulated image 116 that most closely matches the original unlabelled image 114. In order to find the statistical deformation that generates the synthetic image 116 that most closely matches the unlabelled image 114, a stochastic gradient descent algorithm can be employed. Such a stochastic gradient descent algorithm, according to at least one embodiment of the invention, can involve the following steps:

Step 1) Initialize the model m with the average shape vector a, m=a.

Step 2) Generate n statistical deformations (as depicted in step 106) of the model, $m_d$ (where, d=1 . . . n, and n>1). This can be carried out by selecting some random weights $w_i$ for each eigenvector $e_i$, i=1 . . . k, where k is the number of eigenvectors, and summing the randomly weighted eigenvectors with the model:

$$\vec{m}_d = \sum_{i=1}^{k} w_i \cdot \vec{e}_i$$

Step 3) For each statistically deformed model, $m_d$, generate a synthetic image (as depicted in step 110) in the target modality $I(m_d)$, according to known laws of physics governing image generation (as noted in step 108).

Step 4) Compute the inverse similarity (distance), D, between the target image $I_t$ and each synthetic image from the deformed models $I(m_d)$. Such a distance measure can be an L-norm, such as the L2-norm:

$$D(I_t, I(\vec{m}_d)) = \|I_t - I(\vec{m}_d)\|$$

Step 5) Select the statistically deformed model that best matches the target image (as depicted in step 112):

$$m = \underset{m_d}{\operatorname{argmin}}\left[D\left(I_t, I(\vec{m}_d)\right)\right]$$

Step 6) Return to "Step 2" above (also depicted as step 106 in FIG. 1), and repeat the sequence of steps until the difference between the synthetic image and the target image is minimized or below some pre-determined threshold.

In addition, the stochastic gradient descent method may be further optimized by changing the range of the random weights w to be large in the first few iterations of the loop and slowly decreased as the number of loops increases.

Accordingly, step 110 of FIG. 1 includes generating simulated and/or synthetic images of the anatomical subject matter in question until a synthetic image that best or most sufficiently matches the unlabeled medical image 114 according to a matching algorithm executed via step 112. In accordance with at least one embodiment of the invention, a matching algorithm can include calculating the difference of images scaled by the L2 norm of the original image.

In at least one embodiment of the invention, as also noted above, steps 106 through 112 form an iterative process that can be optimized using methods such as gradient descent, simulated annealing, and/or other optimization methods that estimate local gradients. Additionally, upon identifying and/or selecting a match in connection with the algorithm in step 112, the labels in the generated synthetic image (as noted in step 110) can be transferred to the unlabeled image 114 for the purposes of segmentation.

Figure 2:
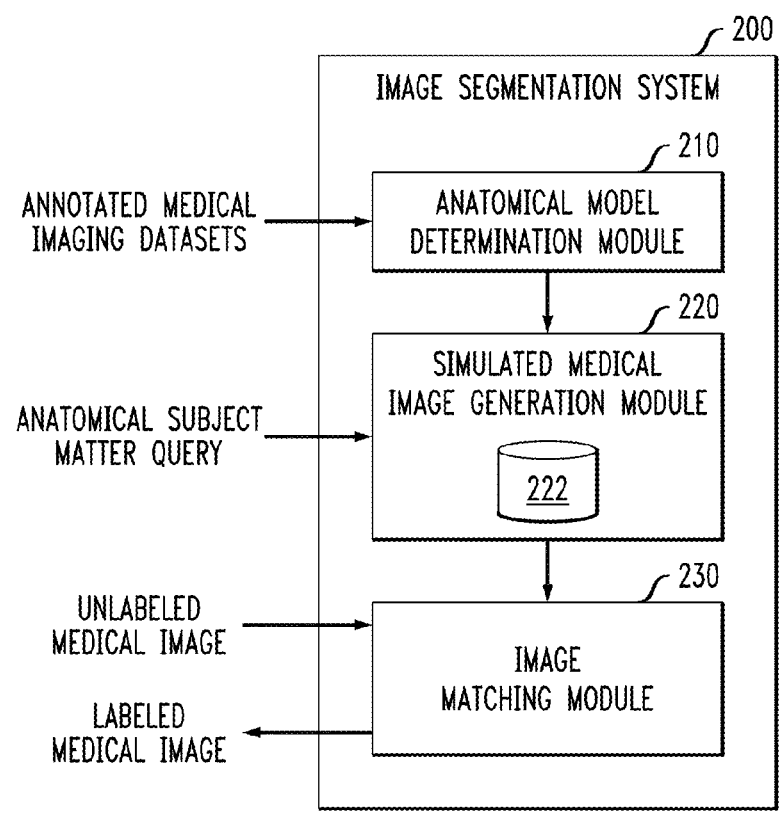
FIG. 2 is a block diagram illustrating an example embodiment, according to an aspect of the invention.

FIG. 2 is a block diagram illustrating an example embodiment, according to an aspect of the invention. By way of illustration, FIG. 2 depicts an image segmentation system 200, which includes an anatomical model determination module 210, a simulated medical image generation module 220 and an image matching module 230. As also depicted in FIG. 2, annotated medical imaging datasets are provided as input to the anatomical model determination module 210, which leverages the datasets to determine one or more deformable statistical anatomical models. Additionally, as detailed herein, the datasets can include, for example, annotated high-resolution 3D medical imaging datasets such as MRI and/or CT datasets.

Further, as depicted in FIG. 2, the simulated medical image generation module 220 uses relevant principles of physics derived from database 222 to generate simulated medical images based on the one or more deformable statistical anatomical models in one or more modalities in response to an anatomical subject matter query provided as input to the simulated medical image generation module 220. The generated simulated medical images are analyzed in connection with an input unlabeled medical image by the image matching module 230 to determine and/or identify the simulated image that best or most sufficiently matches the unlabeled medical image according to a matching algorithm executed via image matching module 230. Upon identifying and/or determining a match, the labels in the matched generated synthetic image are transferred to the unlabeled image and the labeled medical image is output for segmentation.

Figure 3:
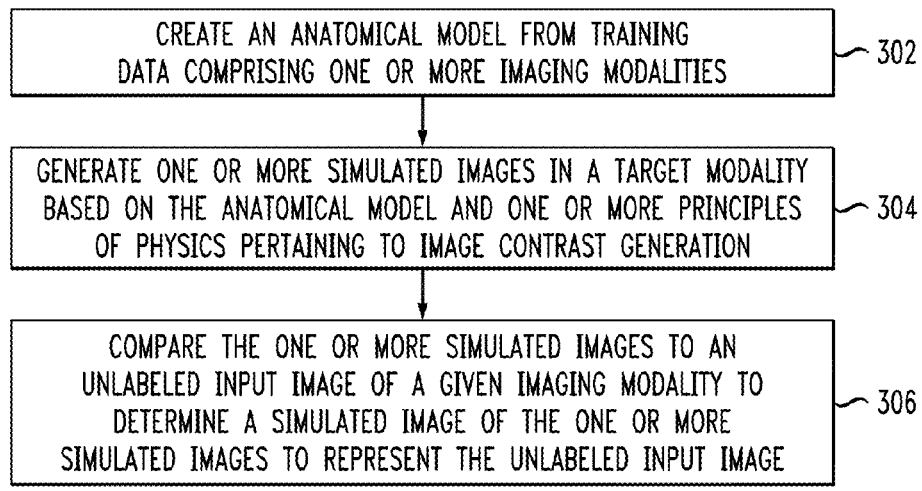
FIG. 3 is a flow diagram illustrating techniques according to an embodiment of the invention.

FIG. 3 is a flow diagram illustrating techniques according to an embodiment of the present invention. Step 302 includes creating an anatomical model from training data comprising one or more imaging modalities. As detailed herein, the one or more source modalities can include three-dimensional imaging data, x-ray imaging data, magnetic resonance imaging data, positron emission tomography imaging data, two-dimensional imaging data, ultrasound imaging data, computed tomography scan data, and/or echocardiogram data. Also, in at least one embodiment of the invention, the anatomical model can be represented as a statistical shape model, a hierarchical model, etc.

Step 304 includes generating one or more simulated images in a target modality based on the anatomical model and one or more principles of physics pertaining to image contrast generation. Step 306 includes comparing the one or more simulated images to an unlabeled input image of a given imaging modality to determine a simulated image of the one or more simulated images to represent the unlabeled input image. The comparing step can include, for example, implementing a matching algorithm and/or a gradient sampling algorithm.

The techniques depicted in FIG. 3 can also include transferring each of one or more labels in the determined simulated image to the unlabeled input image. Additionally, at least one embodiment of the invention includes iteratively deforming the anatomical model to identify one or more physical properties in the training data, wherein each of one or more training data voxels can be labeled according to a corresponding anatomical entity.

Figure 4:
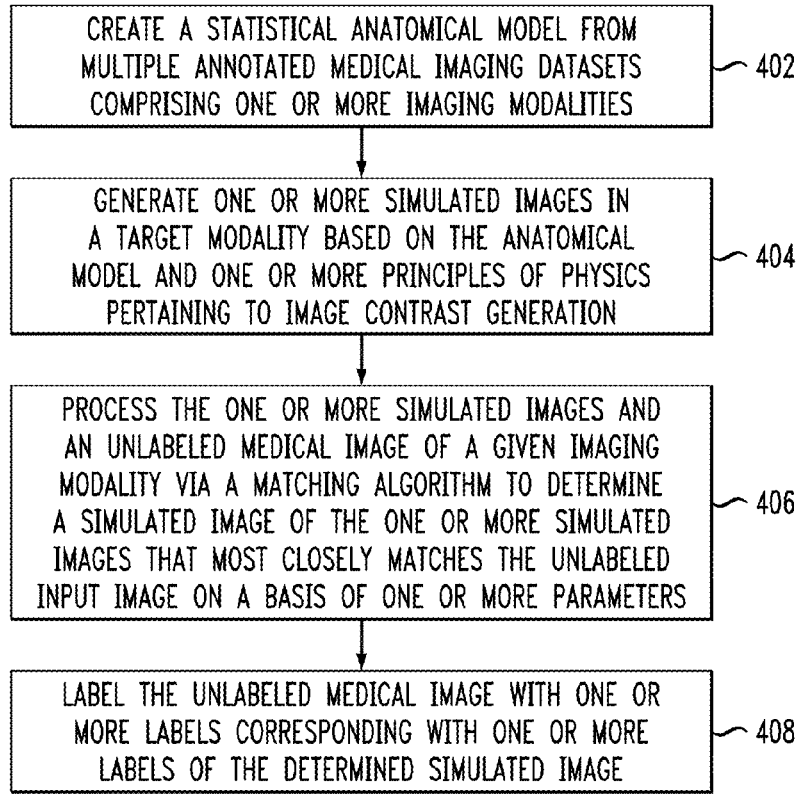
FIG. 4 is a flow diagram illustrating techniques according to an embodiment of the invention.

FIG. 4 is a flow diagram illustrating techniques according to an embodiment of the invention. Step 402 includes creating a statistical anatomical model from multiple annotated medical imaging datasets comprising one or more imaging modalities. Step 404 includes generating one or more simulated images in a target modality based on the statistical anatomical model and one or more principles of physics pertaining to image contrast generation.

Step 406 includes processing the one or more simulated images and an unlabeled medical image of a given imaging modality via a matching algorithm to determine a simulated image of the one or more simulated images that most closely matches the unlabeled input image on a basis of one or more parameters. Step 408 includes labeling the unlabeled medical image with one or more labels corresponding with one or more labels of the determined simulated image.

The techniques depicted in FIG. 3 and FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 and FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 5:
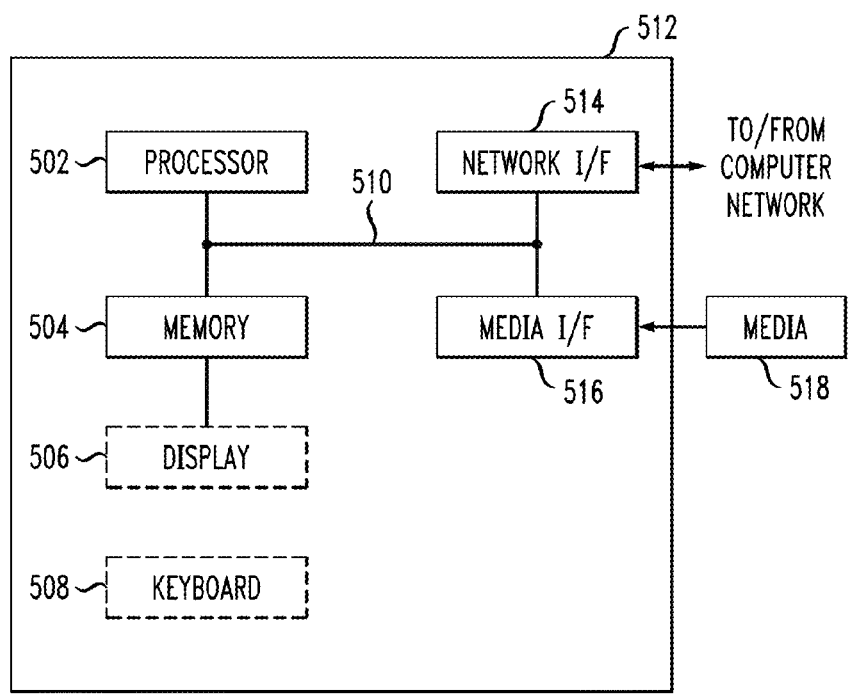
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, using training data from one medical image modality to build a model and using a priori knowledge about the laws of physics governing image generation to transfer the learned model to alternate image modalities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    creating a statistical anatomical model from training data comprising one or more source imaging modalities, wherein the training data comprises multiple anatomical images derived from a population of multiple individuals, wherein each of the multiple anatomical images contains one or more annotations, and wherein said creating comprises:
        representing each of the annotations across the multiple anatomical images as a vector of a numerical value; and
        calculating an average vector across all of the annotations;
    generating one or more simulated images based on the statistical anatomical model and one or more principles of physics pertaining to image contrast generation; and
    comparing the one or more simulated images to an unlabeled input image of a given imaging modality to determine a simulated image of the one or more simulated images to represent the unlabeled input image;
    wherein the steps are carried out by at least one computing device.

2. The method of claim 1, wherein said one or more source imaging modalities comprises three-dimensional imaging data.

3. The method of claim 1, wherein said one or more source imaging modalities comprises x-ray imaging data.

4. The method of claim 1, wherein said one or more source imaging modalities comprises magnetic resonance imaging data.

5. The method of claim 1, wherein said one or more source imaging modalities comprises positron emission tomography imaging data.

6. The method of claim 1, wherein said one or more source imaging modalities comprises two-dimensional imaging data.

7. The method of claim 1, wherein said one or more source imaging modalities comprises ultrasound imaging data.

8. The method of claim 1, wherein said one or more source imaging modalities comprises computed tomography scan data.

9. The method of claim 1, wherein said one or more source imaging modalities comprises echocardiogram data.

10. The method of claim 1, further comprising:
    transferring each of one or more labels in the determined simulated image to the unlabeled input image.

11. The method of claim 1, comprising:
    iteratively deforming the statistical anatomical model to identify one or more physical properties in the training data.

12. The method of claim 11, wherein each of one or more training data voxels are labeled according to a corresponding anatomical entity.

13. The method of claim 1, wherein said statistical anatomical model is represented as a statistical shape model.

14. The method of claim 1, wherein said statistical anatomical model is represented as a hierarchical model.

15. The method of claim 1, wherein said comparing comprises implementing a matching algorithm.

16. The method of claim 1, wherein said comparing comprises implementing a gradient sampling algorithm.

17. A method comprising:
    creating a statistical anatomical model from multiple annotated medical imaging datasets comprising one or more source imaging modalities, wherein the multiple annotated medical imaging datasets comprises multiple anatomical images derived from a population of multiple individuals, wherein each of the multiple anatomical images contains one or more annotations, and wherein said creating comprises:
        representing each of the annotations across the multiple anatomical images as a vector of a numerical value; and
        calculating an average vector across all of the annotations;
    generating one or more simulated images based on the statistical anatomical model and one or more principles of physics pertaining to image contrast generation;

processing the one or more simulated images and an unlabeled medical image of a given imaging modality via a matching algorithm to determine a simulated image of the one or more simulated images that most closely matches the unlabeled input image on a basis of one or more parameters; and labeling the unlabeled medical image with one or more labels corresponding with one or more labels of the determined simulated image;

wherein the steps are carried out by at least one computing device.

18. The method of claim 17, wherein said one or more source imaging modalities comprise at least one of three-dimensional imaging data, x-ray imaging data, magnetic resonance imaging data, positron emission tomography imaging data, two-dimensional imaging data, ultrasound imaging data, computed tomography scan data, and echocardiogram data.

* * * * *